Nov. 14, 1961     E. BREUNING     3,009,108
MEASUREMENT OF ELECTRIC CHARGES PUT ON A CONDENSER
Filed Feb. 27, 1952
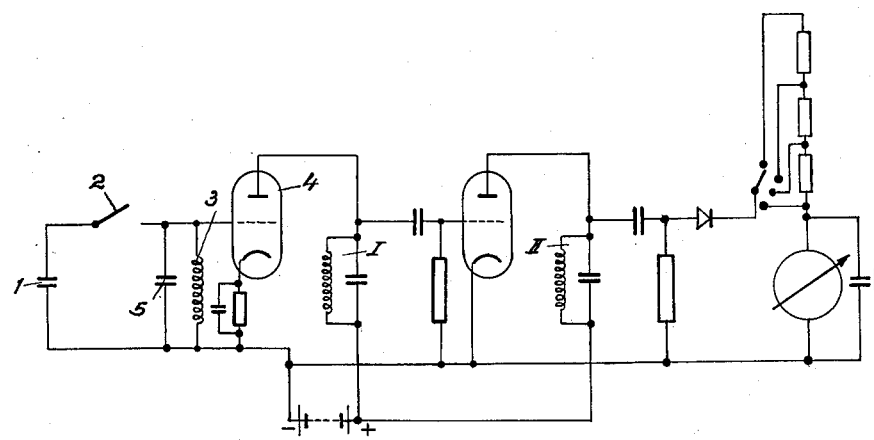
INVENTOR
Ernst Breuning
BY Burgess + Dinklage
ATTORNEY:

United States Patent Office 3,009,108
Patented Nov. 14, 1961

3,009,108
MEASUREMENT OF ELECTRIC CHARGES PUT ON A CONDENSER
Ernst Breuning, Gerlingen, Kreis Leonberg, Germany, assignor to Lufttechnischen Gesellschaft m.b.H., Stuttgart-Zuffenhausen, Germany, a corporation
Filed Feb. 27, 1952, Ser. No. 273,744
Claims priority, application Germany July 6, 1951
3 Claims. (Cl. 324—111)

This invention relates to improvements in the measurement of electric charges put on a condenser. It more particularly relates to a new and useful method for measuring the electric charges put on a condenser hereinafter referred to as a measuring condenser.

Charges put on a measuring condenser are conventionally measured with electrometers, electrometer tubes or ballistic galvanometers. Proposals have also been made to make the measurements with ballistic galvanometers used in combination with amplifying tubes such as triode vacuum tubes.

None of the conventional methods used for measuring the electric charges put on measuring condensers, however, have proven completely satisfactory. All these known measuring methods have considerable disadvantages.

As is well known, the operation of electrometers is very cumbersome and the use of electrometer tubes is impossible when very small potential differences are to be measured and when the measuring condenser has a very small capacity.

Finally, ballistic galvanometers are not suitable for the measurement of very small charges and may not be used in combination with amplifying tubes when they possess small capacities.

One object of this invention is the measurement of electric charges put on a measuring condenser without the aforementioned difficulties. This and still further objects will become apparent from the following description read in conjunction with the drawings which shows an embodiment of a circuit which may be employed for effecting the new measurement method in accordance with the invention:

According to the invention, the electric charges put on a measuring condenser are caused to oscillate in electromagnetic oscillating circuit. The electro-magnetic oscillations are then amplified, the magnitude measured, and the electric charge measured from this.

In this way, a faultless amplification of even very small charges to up to 10 to the sixth power times the size of these charges is obtained by the means conventionally known in the high frequency technique. In addition, the amplification of charges put on a measuring condenser of very small capacity is made possible.

Finally, it is now possible, according to the new method to use relatively insensitive instruments, such as ballistic instruments of normal sensitivity or Braun's tubes for the measuring.

The new method, according to the invention, has the further advantage that it is now possible to vary the sensitivity of the measuring device in the simplest manner using well known conventional practices.

According to further extension of the invention, it is now possible to provide a halting point of the indicator of the measuring instrument when measuring a single charge. A condenser of high capacity to which the amplified oscillation is directed after rectification serves this purpose advantageously by acting as indication holding means and preventing the needle on the measuring instrument from immediately reverting to its original position thus enabling the instrument to be more readily read.

The amplification of the oscillation may be effected, in accordance with conventional manner by using the same to change the potential of the grid element of a triode. In order to eliminate the influence of the grid conductance of the first tube of such an amplifier connected with the electro-magnetic oscillating circuits, the inductance of this oscillating circuit should be placed in parallel with the grid cathode line of the first tube.

Experiments have shown that when the measuring condenser is put in the oscillating circuit harmful interference effects such as recoil or chattering effects often appear. In order to avoid these effects in accordance with the invention, an additional condenser is put into the oscillation circuit in parallel with the measuring condenser. The connection, such as switch connection, for placing the measuring condenser in the oscillation circuit is made between the measuring condenser and the aforementioned additional condenser. It has been found advantageous to use an additional condenser whose capacity is relatively large in comparison to that of the measuring condenser.

The effect of this arrangement is that the measuring condenser will then represent only a part of the capacity of the oscillating circuit and thus only a small part of the current of the oscillation in the oscillation circuit passes through the closing switch and in this way these harmful effects are to a large part avoided.

The amplification circuits for the amplification of the oscillation when using an additional condenser should be adjusted to a frequency which lies about midway between the frequencies resulting from the oscillation circuit inductance and the capacity of the additional condenser on one hand and the oscillation circuit inductance and the capacity of the additional condenser as well as the measuring condenser on the other hand. All these harmful effects or influence of the contact will thus be absolutely filtered out through this additional arrangement. The amplification of the oscillations produced is easily adjustable in accordance with conventional practice.

In some cases it may also be suitable to arrange the scale for the measuring instrument used in such a way that the measurement distortions are compensated.

The new method, according to the invention, is more fully described with reference to one embodiment thereof and the circuit diagram shown in the drawings:

The electrical charges to be measured are placed on the condenser 1 called the measuring condenser.

The measuring condenser 1 is placed into the oscillation circuit by closing the switch 2. The oscillation circuit is formed by the inductance of coil 3 in the capacitance of measuring condenser 1.

When the measuring condenser 1 is thus placed in the oscillation circuit, the charges are caused to oscillate and an electro-magnetic oscillation is thus produced. The grid of the amplifying triode tube 4 is connected to the oscillation circuit so that its potential will be varied thereby thus causing an amplification of the oscillation through the tube 4. If necessary, the amplified oscillations are conducted to additional amplifying circuits.

The coil 3 is connected in parallel with the grid cathode line of the first amplifier 4 in order to eliminate the influence of the grid conductance of the amplified tube 4.

Besides, the additional condenser 5 with a high capacity is connected in parallel with the measuring condenser 1 in the oscillating circuit so that the switch 2 is positioned between the measuring condenser 1 and the additional condenser 5. When the switch 2 is closed, charge to be measured will reach the additional condenser 5 very quickly. Then the circuit formed by the two condensers 1 and 5 and the coil 3 will begin to oscillate. The magnitude of the oscillation circuit current will be determined by the capacity of the measuring condenser 1 only in its ratio to that of the additional condenser 5. Thereby, the recoil or chattering effects caused by the closing of the switch 2 are largely eliminated.

To further eliminate these effects, caused by the closing of switch 2, the subsequent amplification stages may be tuned to a frequency which is about midway between the frequencies which result from the oscillation circuit inductance of coil 3 and the capacitance of the additional condenser 5 on one hand and the oscillation circuit inductance of the coil 3 and the capacitance of the additional condenser 5 and the measuring condenser 1 on the other hand.

In accordance with the invention, it is possible to measure, as for example at a frequency of 100 kilocycles charges which produce a potential difference of $\frac{1}{10}$ of a volt with a measuring condenser having a capacity of 50 micro-farads.

Thus, for example, if the measuring condenser 1 has a capacitance of 50 micro-farads, the additional condenser 5 a capacitance of 500 micro-farads and the coil 3 an inductance of 5 henries, the frequency of the oscillations occurring in the oscillation circuit would be about 100 kc.

If now, for instance, a charge of about 0.1 volt were applied to measuring condenser 1, a voltage of about 1 volt would result in the resonant circuit I following the amplifier tube 4 and a voltage of about 100 volts would result in the following circuit II, voltage could be measured without any difficulty.

In order to obtain a reading of the measuring instrument when measuring a single charge, the oscillations of the last amplifier circuit, for instance II, are fed after rectification to a storage or reservoir condenser having a capacitance of for example 0.5 $\mu b$. The voltages occurring at this condenser can, in a known manner, be fed to further amplifier stages and be measured.

The above example is of course given only by way of illustration and not limitation.

The new method allows the measuring of very small charges even with measuring condensers having very small capacities. The measurement in accordance with the invention is not only applicable for measuring charges on special measuring condensers but is also applicable for measuring all charges put on any kind of condenser.

I claim:

1. A circuit for measuring electric charges put on a measuring condenser comprising an inductive coil positioned in parallel with said condenser with a connecting switch therebetween, a triode positioned with its grid connected to one side of said inductive coil and its cathode to the other side of said inductive coil, means for supplying plate current to said triode, electrical measuring means connected to said triode for measuring the magnitude of amplified oscillations therefrom, a supplemental condenser connected in parallel with said measuring condenser and positioned so that said switch is positioned between it and said measuring condenser, said supplemental condenser having a greater capacity than said measuring condenser, at least one additional amplification circuit connected between said triode and said measuring means, said additional amplifying circuit being tuned to a frequency which lies about midway between the frequency which will result from the oscillation of said inductance and the capacity of the supplemental condenser and the oscillation of the inductance and the capacity of the supplemental condenser and the measuring condenser.

2. In a measuring instrument having a condenser for accumulating electrical charges to be measured, the improvement comprising an inductive coil positioned in parallel with said condenser with a connecting switch therebetween, an additional condenser connected in parallel with said measuring condenser positioned so that said switch is positioned between it and said measuring condenser, amplifying means for amplifying oscillations produced in the circuit formed with said inductive coil upon the closing of said connecting switch, and electrical measuring means having a visual indicator and variable sensitivity for measuring the magnitude of the amplified oscillation output from said amplifying means.

3. Improvement according to claim 2 in which said additional condenser has a greater capacity than said measuring condenser.

References Cited in the file of this patent

UNITED STATES PATENTS

| | | |
|---|---|---|
| Re. 22,572 | Miller | Nov. 28, 1944 |
| 1,239,831 | Simpson | Sept. 11, 1917 |
| 1,596,380 | Simpson | Aug. 17, 1926 |
| 1,597,829 | Round | Aug. 31, 1926 |
| 1,837,144 | Bethenod | Dec. 15, 1931 |
| 1,945,096 | Tellegen | Jan. 30, 1934 |
| 2,024,138 | Armstrong | Dec. 17, 1935 |
| 2,039,267 | Barber | Apr. 28, 1936 |
| 2,103,090 | Plebanski | Dec. 21, 1937 |
| 2,153,202 | Nichols | Apr. 4, 1939 |
| 2,266,668 | Tubbs | Dec. 16, 1941 |
| 2,309,560 | Welty | Jan. 26, 1943 |
| 2,311,631 | Bach | Feb. 23, 1943 |
| 2,351,439 | Livingston | June 13, 1944 |
| 2,410,087 | Litton | Oct. 29, 1946 |
| 2,416,276 | Ruge | Feb. 18, 1947 |
| 2,565,542 | Arnold | Aug. 28, 1951 |
| 2,685,001 | Darke | July 27, 1954 |
| 2,713,639 | Blackman | July 19, 1955 |